United States Patent [19]

Rosenberg et al.

[11] 4,154,987
[45] May 15, 1979

[54] PARTY INTERCEPT IN SELECTIVE MULTIFREQUENCY RINGING SYSTEMS

[75] Inventors: Roger L. Rosenberg, Arlington Heights; Richard F. Maier, Chicago, both of Ill.

[73] Assignee: Circom, Inc., Bensenville, Ill.

[21] Appl. No.: 852,520

[22] Filed: Nov. 17, 1977

[51] Int. Cl.² .......................................... H04M 13/00
[52] U.S. Cl. .................................................. 179/17 E
[58] Field of Search ................. 179/17 E, 27 E, 27 G, 179/18 HB

[56] References Cited

U.S. PATENT DOCUMENTS

| | | | |
|---|---|---|---|
| 3,210,479 | 10/1965 | Engelschall | 179/17 E X |
| 3,601,551 | 8/1971 | Weber | 179/27 G X |
| 4,048,448 | 9/1977 | Canniff et al. | 179/17 E |
| 4,056,694 | 11/1977 | Brolin | 179/17 E X |

Primary Examiner—Thomas W. Brown
Attorney, Agent, or Firm—Hill, Gross, Simpson, Van Santen, Steadman, Chiara & Simpson

[57] ABSTRACT

A system for directing calls to selected parties on a multiparty line in exchanges equipped with selective multifrequency ringing generators is disclosed. Ringing applied to the line is converted to a DC logic level pulse train and is compared to logic level pulse trains generated for each frequency of the ringing generator. If the party represented by the frequency on the line has been manually selected for intercept and the pulse trains match for 250 milliseconds, the call is intercepted. Since the pulse trains are at logic level and are generated by the same ringing cycle, they are immune to phase shifts, voltage variations, and electrical noise.

10 Claims, 5 Drawing Figures

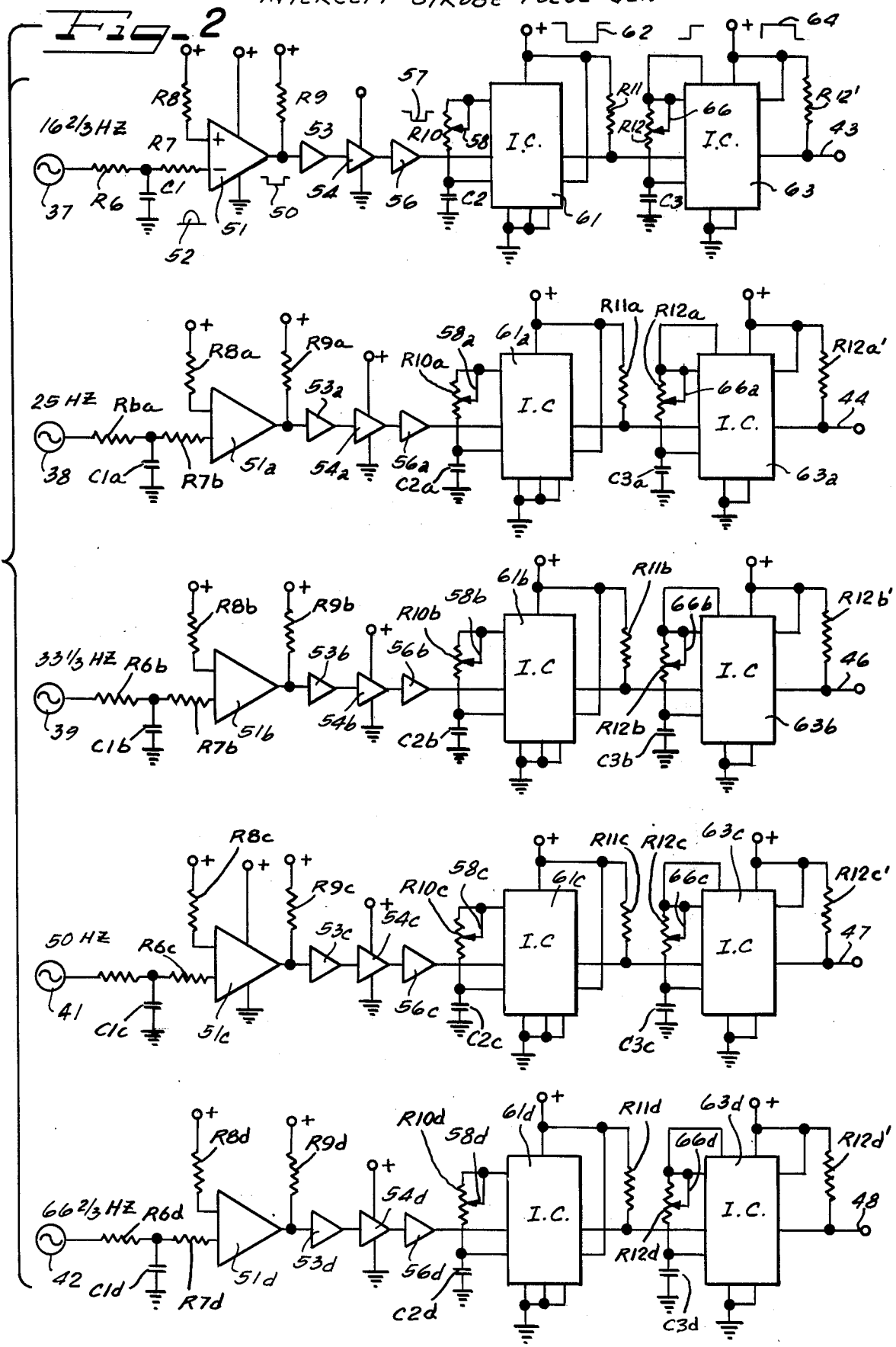

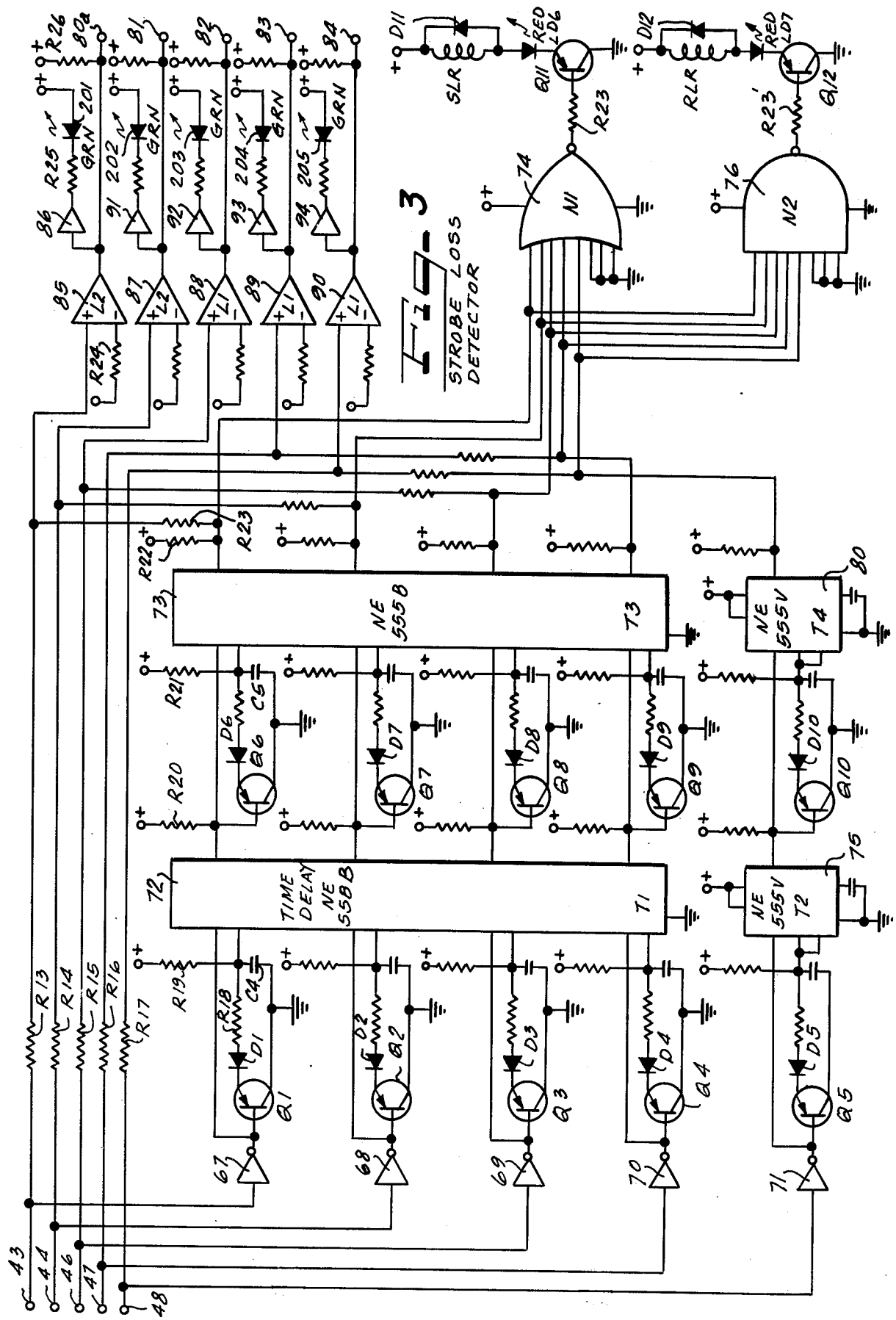

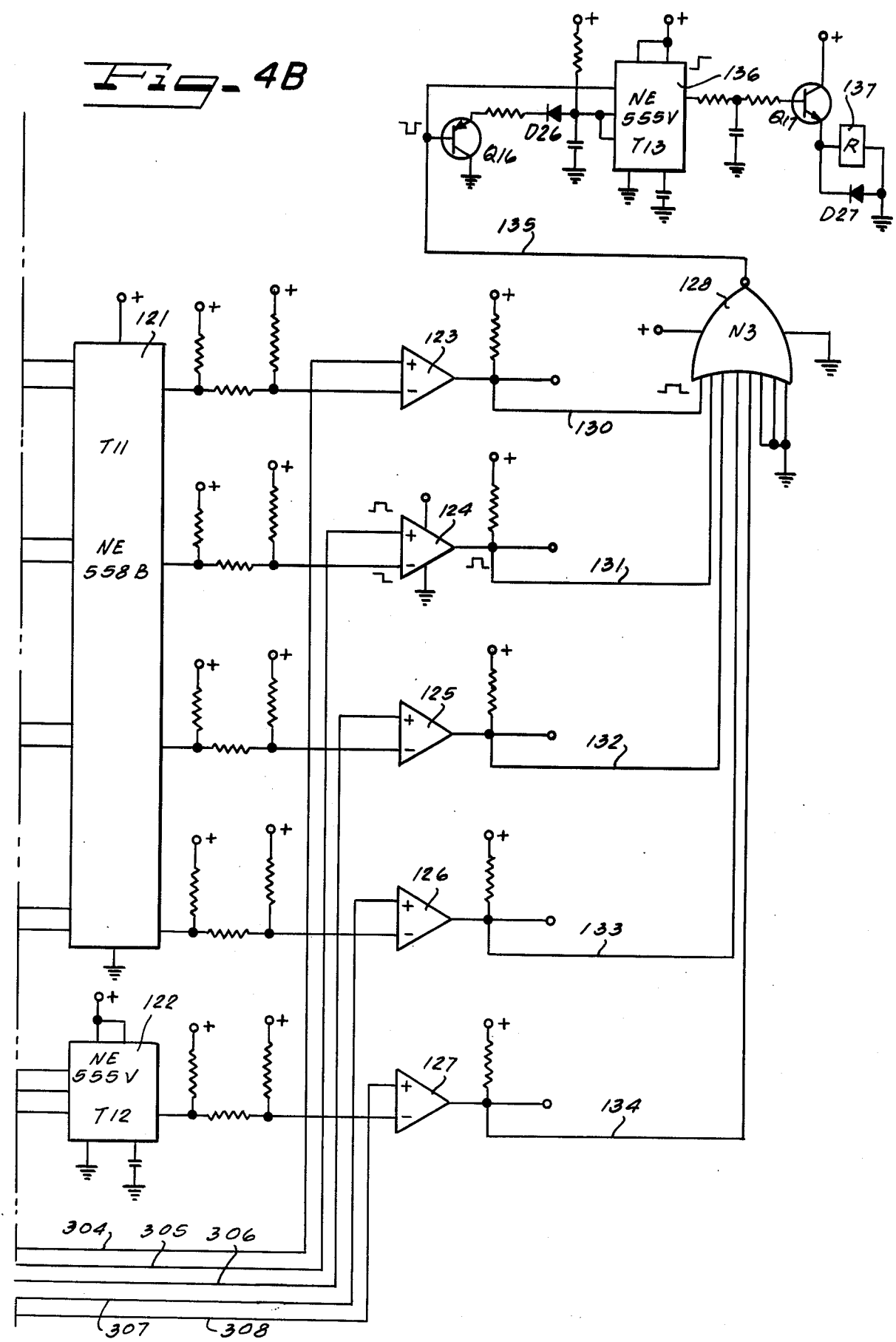

PARTY INTERCEPT IN SELECTIVE MULTIFREQUENCY RINGING SYSTEMS

BACKGROUND OF THE INVENTION

1. Field of the Invention

This invention relates in general to intercepting service for party lines in terminal party line systems for telephone systems and in particular to a novel apparatus and method.

2. Description of the Prior Art

Intercepting service for automatic telephone systems has been available for many years. In terminal per station systems, the method of intercepting calls to stations on any line, individual or party, is relatively simple and straightforward since each main station is associated with its own individual connector terminal.

The method employed in terminal per line systems is, however, more complex because one connector terminal connected to a party line may be associated with several stations. The problem then is to find a method of distinguishing one particular station from the others. There have been a number of schemes employed depending upon the type of ringing supply used. The most common form of ringing in independent practice has been some form of multifrequency selective ringing.

Generally speaking, the last digit of the directory number designates the ringing frequency employed. Party line stations on the same line associated with the same connector terminal may have any digit from "1" to "0" as the last digit of the directory numbers. Since the ringing sources are limited to five frequencies, parties "1" to "5" have telephone ringers connected from one side of the line to ground while parties "6" to "0" have ringers connected from the opposite side of the line to ground. Thus, ten party selective ringing can be provided. Semi-selective ringing using ten bridged ringers can be obtained by using one or two ring signals of each of the five frequencies available.

There are other methods of ringing telephones such as non-selective code ringing using a single ringing frequency, superimposed ringing using a single frequency upon which is a superimposed a negative or positive battery potential to ground to achieve selectively of ringing for four parties. This system may also employ two rings of each type of superimposed ringing current to achieve semi-selective signaling on party lines having eight parties or three rings for parties 9 and 10 on a ten party line.

An early system of intercepting parties in terminal per line systems using multifrequency ringing used a modified traffic ringer on party lines. A traffic ringer comprises a telephone ringer movement tuned to ring on only one frequency. Instead of using conventional clapper and bells associated with the ringer, the traffic ringer was equipped with spring contacts which would close a circuit to an auxiliary relay which in turn would connect the associated line to a trunk. A traffic ringer in the central office was provided for each intercepted station on a party line. If more than one station on a line required intercept service, a traffic ringer was supplied for each station. Each traffic ringer would respond to only one frequency so while the connector terminal was jumpered to the intercept rack, only those stations requiring intercepts would be picked-up when the ringing frequency associated with the station was applied to the line. Active stations would not be effected. This practice has not been economical for general use although it is still used in many places. The use of the traffic ringer technique has lead to considerations that any intercepting scheme which is associated with a multifrequency ringing scheme should employ some form of frequency discriminating device for detection of a station to be intercepted.

The fundamental concept of match pulse intercept is based on the fact that at any given time only one frequency of ringing current is being supplied to a particular group of connectors. With matched pulse intercept, a pulse of positive battery is supplied to the intercept rack at the same time. This "matching" pulse is used to control intercepting line relays which will in turn connect an individual station on a party line to the intercept trunk.

Each of the foregoing ringing schemes present their own problems for intercepting device service and each has a particular solution. It should be realized that matched pulse apparatus is applicable to all of the ringing schemes presently in use.

Because harmonic or multifrequency ringing is quite common, in the independent field, this form of ringing will be described relative to the present invention.

SUMMARY OF THE INVENTION

The present invention relates to a novel intercept system which provides for strobe cards that convert ringing generator frequencies to logic level pulses for use by solid state detection equipment. A strobe loss detector card monitors the output pulses of the strobe card and give an alarm indication upon failure of one or more strobes. A green indicator light indicates proper operation and a red indicator light indicates an alarm condition. Operator trunk cards are provided for manual intercept. Intercept line cards will pick-up any parties on a line from 1 to 10 depending upon which switches are closed. Tip and ring connections are required for automatic pickup and manual pick-up. The automatic pick-up will not cut through to the announcer until the announcer is at normal condition. One complete announcement is given and then cuts off. A series guard circuit is incorporated to allow only one line card at a time to take control of the operator trunk. Because of the guard circuit all cards associated with an operator trunk must be plugged in or associated pins on the connector of the missing card line must be shorted.

The present invention provides a novel inexpensive pick-up system.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 2 is a diagram of the intercept strobe pulse generator;

FIG. 3 is a diagram of the strobe loss detector; and

FIGS. 4A and 4B are diagrams of the intercept cards of the system.

DESCRIPTION OF THE PREFERRED EMBODIMENTS

The circuits of the invention are capable of selectively intercepting calls to one or more parties on a multiparty line. The invention will function in terminal per line offices as well as terminal per station offices without the need for changing the ringing generator or office cabling.

Figure 1:
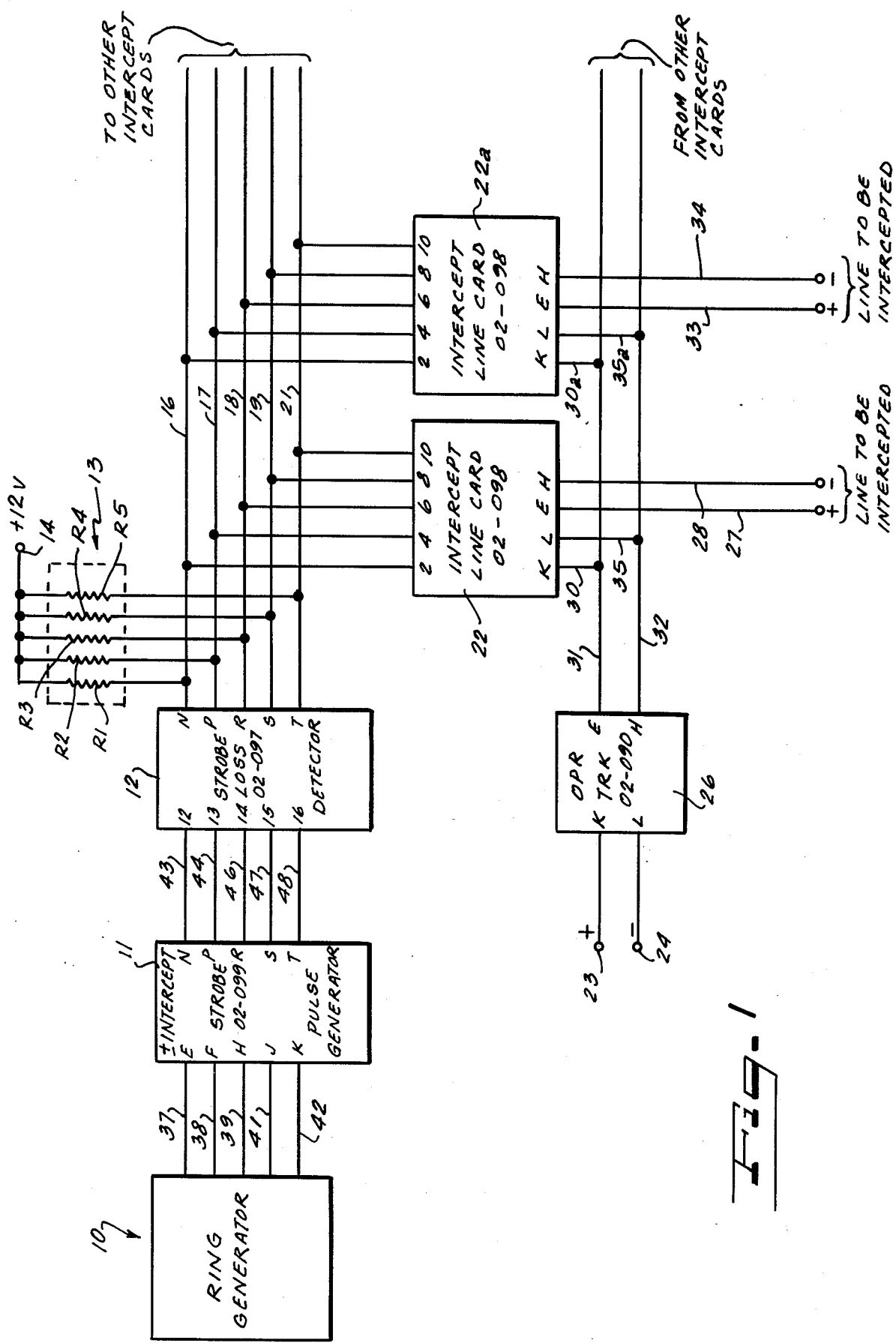
FIG. 1 is an overall block diagram of the pick-up system of the invention.

FIG. 1 illustrates in block form the overall combination of the invention and illustrates a ring generator 10 which provides outputs on five lines 37, 38, 39, 41 and 42 each of which is at a different frequency that might be, for example, 16 ⅔ cycles per second, 25 cycles per second, 33 ⅓ cycles per second, 50 cycles per second and 66 ⅔ cycles per second. An intercept strobe pulse generator 11 receives input signals from lines 37, 38, 39, 41 and 42 and provides output signals on lines 43, 44, 46, 47 and 48 which are supplied to a strobe loss detector 12. The output of strobe loss detector 12 is supplied to lines 16, 17, 18, 19 and 21. Resistors R1, R2, R3, R4 and R5 are mounted in a resistor bank 13 and have their opposite sides connected to 12 volt biasing supply and the first side is connected to the lines 16, 17, 18, 19 and 21. A plurality of intercept line cards 22 and 22a are connected to lines 16, 17, 18, 19 and 21. Each of the intercept line cards have two output lines such as lines 27 and 28 from line intercept card 22 which are connected to the line to be intercepted. Intercept line card 22a has output lines 33 and 34 which are connected to a second line to be intercepted. A large number of intercept line cards may be connected to lines 16, 17, 18, 19 and 21, for example. Lines 31 and 32 are respectively connected to input lines 30 and 35 of each of the intercept line cards 22, 22a and so forth. An operator trunk 26 is connected to lines 31 and 32 and has input terminals 23 and 24 as shown.

The intercept strobe pulse generator 11 is illustrated in detail in FIG. 2. Input lines 37, 38, 39, 41 and 42 are illustrated. Line 37 is carrying the 16 ⅔ cycle frequency and is connected to a resistor R6 which is connected to a resistor R7 that has its other side connected to operational amplifier 51 that might be, for example, a National SemiConductor type LM 3900N. A resistor R8 is connected between amplifier 51 and a biasing source. A capacitor C1 is connected between the junction point between resistors R6 and R7 and ground. A half cycle pulse 52 passes through amplifier 51 and is formed into a square wave pulse 50 at the output thereof. A resistor R9 is connected between the output of amplifier 51 and a suitable bias source. Buffer driver 53 receives the output of amplifier 51 and supplies it to a buffer driver 54 which supplies output to buffer driver 56. The output of buffer driver 56 is supplied to a timer 61 which might be a National SemiConductor type LM322N. The timer 61 provides phase timing and supplies an output to an integrated circuit 63 which might be a National SemiConductor type LM322N. The unit 63 provides pulse width timing and, thus, the phase timing which is illustrated by the pulse 62 is synchronized so as to be in phase with the ringing at line 37 and the pulse 64 at the output of unit 63 appears at terminal 43. Potentiometers 58 and 66 are associated with resistors R10 and R12 respectively and these potentiometers allow the timing to be synchronized with the ringing frequency at line 37. The lines 38, 39, 41 and 42 from the ring generator 10 pass through circuits which are similar to the circuit between terminals 37 and 43 but which are respectively adapted to handle tones at different frequencies as, for example, 25, 33 ⅓, 50 and 66 ⅔ cycles per seconds, respectively. The outputs of the circuits which are equivalent to circuit between terminals 37 and 43 or respectively between terminals 38 and 44, 39 and 46, 41 and 47 and 42 and 48, respectively and equivalent components are identified by letters a-d, respectively.

FIG. 3 illustrates the strobe loss detector 12 and the output terminals 43, 44, 46, 47 and 48 from pulse generator 11 are applied to resistors R13, R14, R15, R16, R17 of the strobe loss detector as shown in FIG. 3. These input terminals are also, respectively connected to invertor drivers 67, 68, 69, 70 and 71 as shown. Transistors Q1, Q2, Q3, Q4 and Q5 are respectively connected to invertor drivers 67, 68, 69, 70 and 71 as shown. A 90 millisecond time delay which might be a Signetics Corp. type NE558B is connected to the output of the transistors Q1 through Q4, respectively through biasing diodes and resistors as shown. A timing circuit 75 which might be a Signetics Corp. type NE555V receives the output of transistor Q5 through a diode and resistor. The time delay 72 provides outputs to transistors Q6 through Q9 and the time delay 75 provides an output to transistor Q10. A time delay 73 which might be a Signetics Corp. type NE558B receives outputs from the transistors Q6 through Q9. A circuit 80 which might be a Signetics Corp. type NE555V receives an output from the transistor Q10. Operational amplifiers 85, 87, 88, 89 and 90 are connected to the second sides of resistors R13 through R17 and have their outputs respectively connected to output terminals 80a, 81, 82, 83 and 84 respectively. Buffer driver 86 is connected to the output of amplifier 85 and supplies a signal through resistor R25 to an indicator 201 which might, for example, be a green light. The output of amplifier 87 is supplied to buffer driver 91 which supplies an output through a resistor to a green light 202. Buffer driver 92 is connected to the output of amplifier 88 and supplies an output to a green light 203 through a resistor. Buffer driver 93 is connected to the output of the amplifier 89 and supplies input to a green light 204 through a resistor. Buffer driver 94 is connected to the output of amplifier 90 and supplies an output to a green light 205 through a resistor. A gate 74 is connected to resistors R13 through R17 through resistors such as R23. Gate 74 is also connected to outputs from timer 73 and 80 with four outputs from timer 73 and one output from timer 80. A gate 76 is connected with parallel inputs to the gate 74. Gate 74 may be a RCA type CD4078AE and gate 76 may be a RCA type CD4068AE. The output of gate 74 is connected through a resistor R23 to a transistor Q11 which is connected to a red indicator LD6 and to a relay SLR. The output of gate 76 is connected to a resistor R23' and to a transistor Q12. A red indicator LD7 is connected to transistor Q12 and a relay RLR is connected to the other side of the indicator LD7.

Figure 4A:
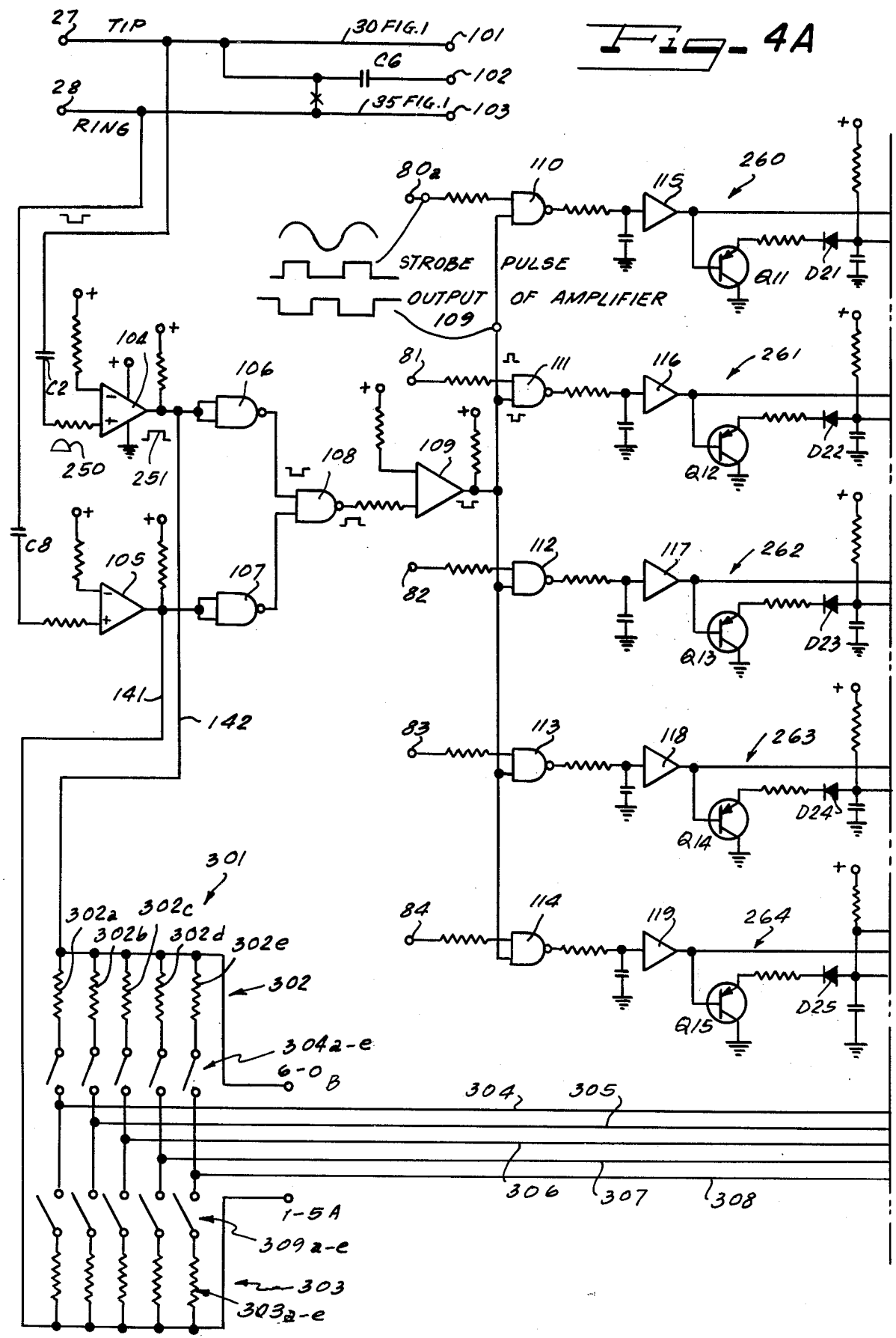

In FIGS. 4A and 4B, lines 27 and 28 illustrated in FIG. 1 are connected to lines 101 and 103, respectively. Line 102 is connected by capacitor C6 to line 101. An amplifier 104 is coupled through a resistor and a capacitor C7 to line 27. An amplifier 105 is coupled through a resistor and capacitor C8 to line 28. The amplifiers 104 and 105 may be a National SemiConductor type LM3900N. Thus, the amplifier 104 passes one side of the line 27 and the amplifier 105 passes the other side of the line 28. A gate 106 receives the output of amplifier 104 and a gate 107 receives the output of amplifier 105.

The gates 106 and 107 may be a Motorola type MC14011CP. A gate 108 receives inputs from the gates 106 and 107 and may also be a Motorola type MC14011CP. A plurality of frequency comparing circuits 260, 261, 262, 263 and 264 are respectively connected to the output of the strobe loss detector terminals 80a, 81, 82, 83 and 84. These circuits detect the frequencies 16 ⅔ cycles, 25 cycles, 33 ⅓ cycles, 50 cycles and 66 ⅔ cycles, respectively. Input gates 110, 111, 112, 113 and 114 are respectively connected to the terminals 80a and 81 through 84 and also receive second inputs from the output of amplifier 109. The gates 110 through 114 may be a Motorola type MC14011CP. Buffer drives 115 through 119, respectively, receive the outputs of gates 110 through 114. The output of amplifiers 115 through 118 are supplied to a timer T11 which may be a National SemiConductor type NE558B which is designated by 121. A timer 122 receives the output of gate 119 and might be a National SemiConductor type NE555V. Transistors Q11 through Q14 also receive the outputs of amplifiers 115 through 118 and supply inputs to the timer 121 through resistors and diodes D21 through D24, respectively. A transistor Q15 supplies an input to timer 122 through a resistor and diode D25. When the transistors Q11 through Q15 turn off, the respective timers start to time. Output terminals of the timer 121 are respectively connected to amplifiers 123 through 126 and an output of timer 122 is connected to an amplifier 127. The outputs of amplifiers 123 through 127 are supplied to an input of a gate 128 which may be a RCA type CD4078B. The output of gate 128 is supplied to lead 135 which is connected to the base of a transistor Q16 and also to an input terminal of an integrated circuit 136 which might be a National SemiConductor type NE555V. The output of transistor Q16 is also supplied to integrated circuit 136 through a resistor and diode D26. A transistor Q17 has its base coupled to an output of the integrated circuit 136 and supplies an output to detect relay 137 which when energized indicates that a selected frequency has been intercepted on an incoming line. The outputs of gates 104 and 105 are also connected to lines 141 and 142 which are respectively connected to a plurality of resistors 302, 302a through 302e. Line 141 is connected to a plurality of resistors 303 indicated by individual resistors 303a through 303e. A plurality of switches 304a through 304e are connected to the other side of resistors 302a through 302e and engage lines 304, 305, 306, 307 and 308, respectively. A plurality of switches 309a through 309e are connected to the other side of resistors 303a through 303e and are also respectively connected to lines 304 through 308, respectively. The lines 304 through 308, respectively, are connected to the gates 123 through 127, respectively.

Thus, the system operates by comparing the ringing frequency present on the line to the strobe pulses generated from each of the ringing frequencies out of the ringing generator. Each strobe pulse is adjusted to be in phase with the ringing frequency and its duration to be longer than one half of the period of any harmonic.

Strobe pulses are fed to all intercept cards. When ringing is applied to a line connected to an intercept card, the ringing frequency is converted to logic level pulses. The duration of each pulse is approximately one half of the period of the ringing frequency. These pulses are compared to all strobe pulses on the intercept card. If the pulses correctly match in both phase and duration for a period of 270 milliseconds the detection circuit for that frequency is armed. Each party is identified by a particular ringing frequency and is assigned a switch on the pick-up card. For intercept to occur the detection circuit must be armed, the corresponding party's switch for that frequency must be closed, and this condition must be maintained for approximately 250 milliseconds. The requirement for the match to last 250 milliseconds after the arming of the detection circuit eliminates an incorrect pick-up resulting from momentary bridging or electrical noise spikes.

The receiving address for a particular line card is manually set by setting the switches 309a–309e and 304a–304e.

It is seen that this invention provides a novel pick-up system and although it has been described with respect to preferred embodiments it is not to be so limited as changes and modifications may be made therein which are within the full intended scope as defined by the appended claims.

We claim as our invention:

1. A pick-up system for telephone systems comprising a ring generator producing a plurality of output signals, an intercept strobe pulse generator receiving the outputs of said ring generator and producing a plurality of outputs each having a different frequency, a plurality of intercept line circuits connected to the outputs of said intercept strobe pulse generator and also connected to the lines which are to be intercepted, each of said intercept line circuits including a plurality of two position switches that are manually set to select the parties on the line which are to be intercepted, a plurality of frequency comparing circuits in each intercept line circuit which are connected to the outputs of said intercept strobe pulse generator and to a line which is to be intercepted, a timer connected to the outputs of said frequency comparing circuits, a plurality of gates connected to the output of said timer and to said plurality of switches, and an intercept actuator connected to outputs of said gates.

2. A pick-up system according to claim 1 wherein intercept is manually performed upon lighting of an indicator by intercept circuit.

3. A pick-up system according to claim 1 wherein said intercept actuator includes a relay.

4. A pick-up system according to claim 1 wherein a second gate is connected to the intercept circuit output and has its output connected to said intercept actuator.

5. A pick-up system according to claim 1 wherein said plurality of frequency comparing circuits receive signals of different frequencies from said intercept strobe pulse generator.

6. A pick-up system according to claim 5 wherein said line to be intercepted has two sides which are connected to a gating means connected between two sides and the inputs of said frequency comparing circuits.

7. A pick-up system according to claim 1 wherein said intercept strobe pulse generator has a plurality of channels with a channel for each frequency used for signalling, and each channel including pulse shaping means, pulse phase timing means and pulse width timing means.

8. A pick-up system for telephone systems according to claim 1 including an amplifier means connected to receive the outputs of said intercept strobe pulse generator and to supply outputs to said intercept line circuits and for indicating the presence or loss of pulses of a particular frequency.

9. A pick-up system according to claim 8 wherein said amplifier means produces no output if no strobe pulse input is present.

10. An intercept system according to claim 1 wherein a number of intercept strobe pulse generators are connected to the outputs of said ring generator, and a plurality of intercept line circuits are connected to each of said intercept strobe pulse generators.

* * * * *

UNITED STATES PATENT AND TRADEMARK OFFICE
CERTIFICATE OF CORRECTION

PATENT NO. : 4,154,987
DATED : May 15, 1979
INVENTOR(S) : Roger Rosenberg et al

It is certified that error appears in the above-identified patent and that said Letters Patent are hereby corrected as shown below:

Column 1, line 61, delete --intercept--.

Signed and Sealed this

Eleventh Day of March 1980

[SEAL]

Attest:

SIDNEY A. DIAMOND

Attesting Officer

Commissioner of Patents and Trademarks